United States Patent Office 3,444,286
Patented May 13, 1969

3,444,286
REVERSE OSMOSIS MEMBRANE COMPOSITION AND MANUFACTURE OF THE MEMBRANE
William M. King, Walnut, and Paul A. Cantor, Covina, Calif., assignors to Aerojet-General Corporation, El Monte, Calif., a corporation of Ohio
No Drawing. Filed Feb. 21, 1966, Ser. No. 538,498
Int. Cl. B29d 27/00
U.S. Cl. 264—49                                   17 Claims

ABSTRACT OF THE DISCLOSURE

This patent describes a casting solution for the preparation of a reverse osmosis cellulose ester membrane, said solution comprising a cellulose ester, an organic polar solvent for the cellulose ester, a mineral acid swelling agent, and a solvating agent, said mineral acid swelling agent being present on an anhydrous basis in an amount within the range of about 0.1 to 6 parts by weight for each 10 parts of the cellulose ester, and to the method of preparing said membrane by casting said solution in the form of a thin film.

---

This invention relates to reverse osmosis membranes and more particularly to an improvement in the manufacturing of the membranes and an improved casting solution.

It is known to employ cellulose ester membranes usually formed of cellulose acetate in a reverse osmosis technique for the desalination of sea water and generally for the separation of water from various aqueous solutions. In one prior art process for the preparation of the membrane, as taught in Loeb et al., U.S. Patents 3,133,132 and 3,133,137, the cellulose ester is dissolved in a suitable organic solvent such as acetone or the like to form a casting solution which in addition contains water and a swelling agent for the cellulose ester. Loeb et al. disclosed in their patent the use of a perchlorate salt as the swelling agent. The water in the casting solution serves as a solvating agent and is believed to form with the swelling agent, a molecular or ionic complex (a hydrate) which hydrate is attracted to the functional groups of the cellulose acetate, thus achieving a swelling of the cellulose. In the manufacture of the film, the casting solution is dispersed in a thin film on a suitable casting surface to form a membrane, following which the solvent of the thin film is usually permitted to partially evaporate and the film is then set by immersion in cold water. The cast film which has a swollen gel structure is next annealed to accomplish a contraction of the cellulose ester structure to provide a tight membrane having the ability to pass water and restrain passage of salt. Prior to annealing, the cellulose ester membrane possesses a primary gel structure which exhibits high water transport and low salt retentions. Annealing is a syneresis phenomenon wherein the primary gel structure is shrunk as evidenced by loss of water from the membrane. In one prior art process annealing is achieved by immersion of the swollen primary gel membrane in a hot water bath. In another annealing procedure, water is extracted from the primary gel structure by a solvent treatment which comprises immersing the swollen primary gel structure in a water miscible solvent as disclosed in co-pending application of Charles R. Cannon, Paul A. Cantor and William M. King, Ser. No. 528,064 filed Feb. 17, 1966.

It is the principal object of this invention to provide a novel class of swelling agents for the manufacture of the cellulose ester membrane which membrane is characterized by a relatively high flux and an acceptably low salt passage.

It is a still further object of the invention to provide an improved casting solution characterized by the ease with which it can be formulated.

It has been found that mineral acids are superior swelling agents for the preparation of reverse osmosis cellulose ester membranes. It is believed that swelling agents act by associating large quantities of the solvating agent, usually water, with the functional groups of the cellulose ester, that is, in the swelling phenomenon sizeable spheres of water hydrogen bond with the hydroxyl and the ketone groups of the cellulose ester. One theory holds that swelling is effected through formation of metastable complexes involving a highly hydrated ionic species and both the hydroxyl and ketone groups of the cellulose ester. The cation is the species of prime importance with respect to the acquisition of spheres of hydration. It is thought that the ability of the cation to hydrate is related directly to its charge density. The cation of a mineral acid being a proton having a high charge density is very desirable for assisting in the hydrogen bonding of water to the functional groups of the cellulose ester. If the charge density of the cation is too low, hydration will not occur to the degree required. It appears that the anions of the swelling agent play only an indirect role in the hydration and swelling of the cellulose acetate. A large anion with a diffused charge permits the cation, the proton in the case of a mineral acid, to acquire many spheres of hydration, whereas a smaller more nucleophilic anion would tend to prevent the hydration of the proton by the well known mechanism of ion pairing. It has been observed that mineral acids having relatively large anions such as perchloric acid, are somewhat more efficient swelling agents than acids characterized by smaller anions.

In forming the cellulose ester membrane, a solution of cellulose acetate or other cellulose ester is prepared in an organic solvent, for example, acetone, or other known solvent for the cellulose ester. The organic solvents commonly employed are typically low boiling materials. Other organic solvents that have been employed include tetrahydrofuran, dimethyl formamide, dioxane, dimethyl sulfoxide, butyrolactone, and other cellulose ester solvents known to the art. A typical casting solution will comprise 10 grams of cellulose acetate or other ester and adequate solvent to place it in solution, typically 30 grams of acetone in the instance of 10 grams of cellulose acetate. The solution of the cellulose ester is then mixed with the mineral acid swelling agent. The mineral acid is generally provided in an amount on an anhydrous basis within the range of about 0.1 to about 6 grams per 10 grams of the cellulose acetate. The more efficient swelling agents such as perchloric acid will be used in smaller quantities, for example about 0.1 to 0.7 part by weight, preferably about 0.3–0.35, on an anhydrous basis per 10 parts of the cellulose ester.

The casting may be accomplished by feeding the casting solution which may be at room temperature, through a hollow doctor blade with the blade resting on raised brackets at the edges of a casting surface, e.g. a glass plate maintained at around $-10°$ C. Typically, the blade is pulled across the plate at a rate such that the film which is formed has a thickness between 10 and 20 mils. A typical casting rate is around 0.5–10 inches of film per second. Following casting, the film in the instance of an acetone solution is allowed to dry for about 3 minutes at the low temperature to permit evaporation of a portion of the solvent. The length of this drying period will vary considerably with the formulation employed. During the casting operation, the doctor blade, casting surface, which may be a glass plate are all maintained at a low temperature, for example $-10°$ C. in the instance of an acetone solution.

Following casting of the film and the partial evaporation of the solvent, the casting plate and film thereon are dipped into cold water which may range in temperature from 0° to about 10° C. For an acetone casting solution, the temperature of the water bath is preferably maintained at about 1.5 to 2° C. The casting plate is thrust into the ice water bath in one continuous motion with the plate making an angle of about 20° to about 60° with the surface of the water. The film will soon float off the glass casting plate, at which time it will be strong enough to manipulate. The membrane film is rolled up in a damp state. If the film is permitted to dry it will lose its desirable properties and is unsuitable for desalination. It will be understood that the conditions employed in the manufacture of the swollen film will vary considerably depending on the technique used and the composition of the casting solution and whether the film is being produced on a continuous or batch basis.

Various mineral acids may be employed as swelling agents in the casting solution of the invention. Perchloric acid is a preferred material. Hydriodic acid, nitric acid, phosphoric acid are all desirable materials and can be used in casting solutions for producing superior membranes. Hydrolysis of the cellulose ester by perchloric, hydriodic and nitric acid will occur if the casting solutions are stored at room temperature for more than a day. Low storage temperature slows the hydrolysis sufficient to permit storing of these solutions for a week or more without detrimental effects. Phosphoric acid does not cause hydrolysis of the casting solution in the instance of cellulose acetate where held in storage periods up to one month at room temperature. The acid may be supplied to the casting solution in conventional concentrations. However, throughout this specification, the amount of acid employed is given on an anhydrous basis and any water accompanying the acid is included in the water supplied for solvation, that is, for the swelling of the cellulose ester.

While cellulose acetate is the most common cellulose membrane material and is used in the preferred embodiment of this invention, the acetyl group may be substituted by other suitable acyl radicals, such as formyl, propionyl, and butyryl. It is to be understood that the mineral acid swelling agent of the invention is not limited to use with a particular casting procedure or membrane composition. The mineral acid swelling agent of the invention may be employed with compositions using either water or alcohol or other solvating agent in the casting solution.

The desired quantities of solvent for dissolution of the cellulose acetate or other cellulose ester in the preparation of the casting solution are known to the art but generally are those required to provide a workable casting solution. Although not essential, a casting solution typically contains from about 2 to 20 parts of the solvating agent whether it be water or alcohol for each 10 parts of cellulose acetate. In the instance of the casting solution employing water as the solvating agent the water is generally present in the amounts of about 2 to about 9 parts (preferably 2 to 6 parts) for each 10 parts of cellulose acetate.

EXAMPLE I

In the present example several membranes were prepared and tested. A basic cellulose acetate formulation was employed which contains 10 grams of cellulose acetate (having an acetyl group concentration of about 39.8 weight percent), manufactured by Eastman Chemical Co., Rochester, N.Y., bearing the company designation of E-398-3. The 10 grams of cellulose acetate was dissolved in 30 grams of reagent grade acetone. This basic formulation was employed in forming each of the films identified in the accompanying Table I. In the first data column of the table, the amount of acid employed is set forth on an anhydrous basis. Common concentrated acids were used and any water accompanying the acid is included in the water appearing in the second data column of the table.

The membranes were cast on glass plates at −14° C. from solutions kept at room temperature and allowed to dry for about 3 minutes at −14° C. and then immersed in cold water at 1–2° C. The membranes were annealed in a water bath maintained at 85° C. The water content of the finished membrane is found in the column entitled "water content, percent." The appearance of the membrane is found in the adjoining column. The several membranes produced were tested in a reverse osmosis apparatus operated at 1500 p.s.i.g. with a 3.5% sodium chloride water solution (35,000 p.p.m.). The flux through the respective membranes is reported in gallons of water per square foot of the film surface per 24 hour day In the last column of the table the salt concentration in the product water stream issuing from the test cell is given in parts per million of sodium chloride.

TABLE I.—INORGANIC ACID-SWELLED CASTING FORMULATIONS

| Acid | Amount, g. | Water, g. | Water content, percent | Appearance Wet | Appearance Dry | Flux, g.f.d. | Salt, p.p.m. |
|---|---|---|---|---|---|---|---|
| Hydriodic | 0.5 | 5.5 | 52.1 | Cloudy | White | 2.0, 2.5 | 2,900, 3,200 |
| Do | 1.0 | 6.0 | 56.0 | Smoky | do | 18.0 | 600 |
| Hydrochloric | 2.0 | 8.4 | 52.1 | Bluish | Cloudy | 1.0, 1.1 | 3,900, 4,520 |
| Do | 3.0 | 10.1 | 52.1 | do | Smoky | 0.6, 0.6 | 6,150, 9,750 |
| Nitric | 1.0 | 5.43 | 53.0 | Smoky | White | 6.2, 5.6 | 1,000, 640 |
| Do | 2.0 | 5.86 | 57.9 | Bluish | Smoky | 10.2, 10.4 | 1,520, 1,520 |
| Do | 3.0 | 6.29 | 60.0 | Clear | Clear | 8.8, 8.8 | 720, 820 |
| Perchloric | 0.3 | 6.0 | | | | 14 | <500 |
| Phosphoric | 3.0 | 5.0 | 61.6 | Cloudy | White | 15.2, 13.2 | 740, 740 |

EXAMPLE II

The work of this example is concerned with perchloric acid formulations. It has been found that when optimumly formulated perchloric acid is an exceptionally effective swelling agent. In the instant example the formulations were prepared for short drying with minimum acetone being employed. The casting was done with solutions kept at room temperature. The drying time following casting was around 0.1 second, following which the film was immersed in cold water at 1–2° C. The membranes were annealed for five minutes in a water bath maintained at 85° C. The respective membranes were tested in a standard reverse osmosis test apparatus operated at 1500 p.s.i.g. using a 3.5% sodium chloride water solution (35,000 p.p.m.).

The results of the test are represented in Table II where the first column sets forth the quantity of perchloric acid employed on an anhydrous basis. Perchloric acid of a 70–72% concentration was used and the water accompanying the acid is included in the water column of the table. Each of the formulations contains 10 grams of cellulose acetate (having an acetyl group concentration of about 39.8%) manufactured by Eastman Chemical Co., Rochester, N.Y., with the company designation of E-398-3. 10 grams of cellulose acetate was dissolved in the indicated amounts of reagent grade acetone appearing in the second column of the table. The water contents of the respective finished membranes are found in the fifth column of the table. The second formulation in the tabulation of Table II is the optimum among those tested for maximum flux and salt permeation.

TABLE II.—PERCHLORIC ACID FORMULATIONS

| 100% Acid, g. | Acetone, g. | Water, g. | Appearance Wet | Appearance Dry | Water content, percent | Flux, g.f.d. | Salt, p.p.m |
|---|---|---|---|---|---|---|---|
| 0.350 | 25.0 | 6.15 | Bluish | Clear | 55.8 | 15.5, 15.0 | 492, 420 |
| 0.350 | 26.0 | 6.50 | Cloudy | White | 56.9 | 17.0, 17.0 | 460, 460 |
| 0.350 | 26.5 | 6.85 | Smoky | Smoky |  | 18.0, 18.0 | 650, 650 |

As shown in the two tables all of the membranes prepared were capable of removing salt from water. The abilities of the membranes as evidenced by flux and salt permeation vary considerably with the perchloric acid membranes being superior.

Potable water is commonly defined as having a salt content which is not in excess of 400–500 parts per million. Although some of the membranes were not capable of producing potable water in one pass through the test cell from a feed stream containing 35,000 parts per million of sodium chloride (sea water salinity), it is possible with these latter membranes to obtain the desired salt concentration by employing several cells in series where the product stream from the first cell becomes a feed stream to the second cell, etc.

The casting formulation of the invention is illustrated in conjunction with a batch process for forming membranes. However, it should be understood that the process is not limited to a batch operation and could be performed readily on a continuous basis.

Having fully defined our invention we desire to be limited only by the lawful scope of the appended claims. We claim:

1. In a method for preparing a membrane suitable for use in reverse osmosis processing, the improvement comprising:

forming a casting solution made up of a cellulose ester, an organic polar solvent for the cellulose ester, a mineral acid swelling agent, and a solvating agent, said mineral acid swelling agent being present on an anhydrous basis in an amount within the range of about 0.1 to about 6 parts for each 10 parts of cellulose ester; and casting said solution to form the cellulose ester membrane.

2. A method in accordance with claim 1 wherein the mineral acid employed is characterized in having a large anion.

3. A method in accordance with claim 1 wherein the mineral acid is perchloric acid.

4. In a method for preparing a membrane suitable for use in reverse osmosis processing, said method comprising:

forming a solution made up of cellulose acetate, an organic polar solvent for the cellulose acetate, a mineral acid swelling agent, and water, said mineral acid swelling agent being present on an anhydrous basis in an amount within the range of about 0.1 to about 6 parts by weight for each 10 parts of cellulose acetate; and casting said solution to form a cellulose acetate membrane.

5. A process in accordance with claim 4 wherein the mineral acid employed is perchloric acid.

6. A process in accordance with claim 4 wherein the mineral acid is phosphorous acid.

7. A process in accordance with claim 4 wherein the mineral acid is nitric acid.

8. A process in accordance with claim 4 wherein the mineral acid is hydriodic acid.

9. A casting solution for the preparation of a reverse osmosis cellulose ester membrane, said solution comprising a cellulose ester, an organic polar solvent for the cellulose ester, a mineral acid swelling agent, and a solvating agent, said mineral acid swelling agent being present on an anhydrous basis in an amount within the range of about 0.1 to 6 parts by weight for each 10 parts of the cellulose ester.

10. A casting solution in accordance with claim 9 wherein the mineral acid swelling agent is characterized in having a large anion.

11. A casting solution in accordance with claim 9 wherein the mineral acid is perchloric acid.

12. A casting solution in accordance with claim 9 wherein the mineral acid is phosphoric acid.

13. A casting solution in accordance with claim 9 wherein the mineral acid is nitric acid.

14. A casting solution in accordance with claim 9 wherein the mineral acid is hydriodic acid.

15. A casting solution for the preparation of a cellulose acetate membrane, said solution comprising cellulose acetate, an organic polar solvent for the cellulose acetate, a mineral acid swelling agent, and water, said mineral acid swelling agent being present on an anhydrous basis in an amount within the range of about 0.1 to about 6 parts by weight for each 10 parts of cellulose acetate.

16. A casting solution in accordance with claim 15 wherein the mineral acid swelling agent is characterized in having a large anion.

17. A casting solution in accordance with claim 9 wherein the mineral acid is selected from the group consisting of perchloric acid, phosphoric acid, nitric acid and hydriodic acid.

References Cited

UNITED STATES PATENTS

| 3,250,701 | 5/1966 | Watson et al. | 264—49 |
| 3,283,042 | 11/1966 | Loeb et al. | 264—49 |

OTHER REFERENCES

Moeller, Therald Inorganic Chemistry, New York, John Wiley & Sons, 1957, pp. 236–237. QD 151–MG5, c. 2.

U.S. Office of Saline Water "The Mechanism of Desalination by Reverse Osmosis." By Aerojet-General. Research and Development Report No. 84. (November 1963), pp. III-9 through III-11.

Manijikian, S. "Improvement in Fabrication Techniques for Reverse Osmosis Desalination Membranes." First international Symposium on Water Desalination, Oct. 3–9, 1965, Washington, D.C., pp. 1–2.

PHILIP E. ANDERSON, *Primary Examiner*.